Patented May 3, 1938

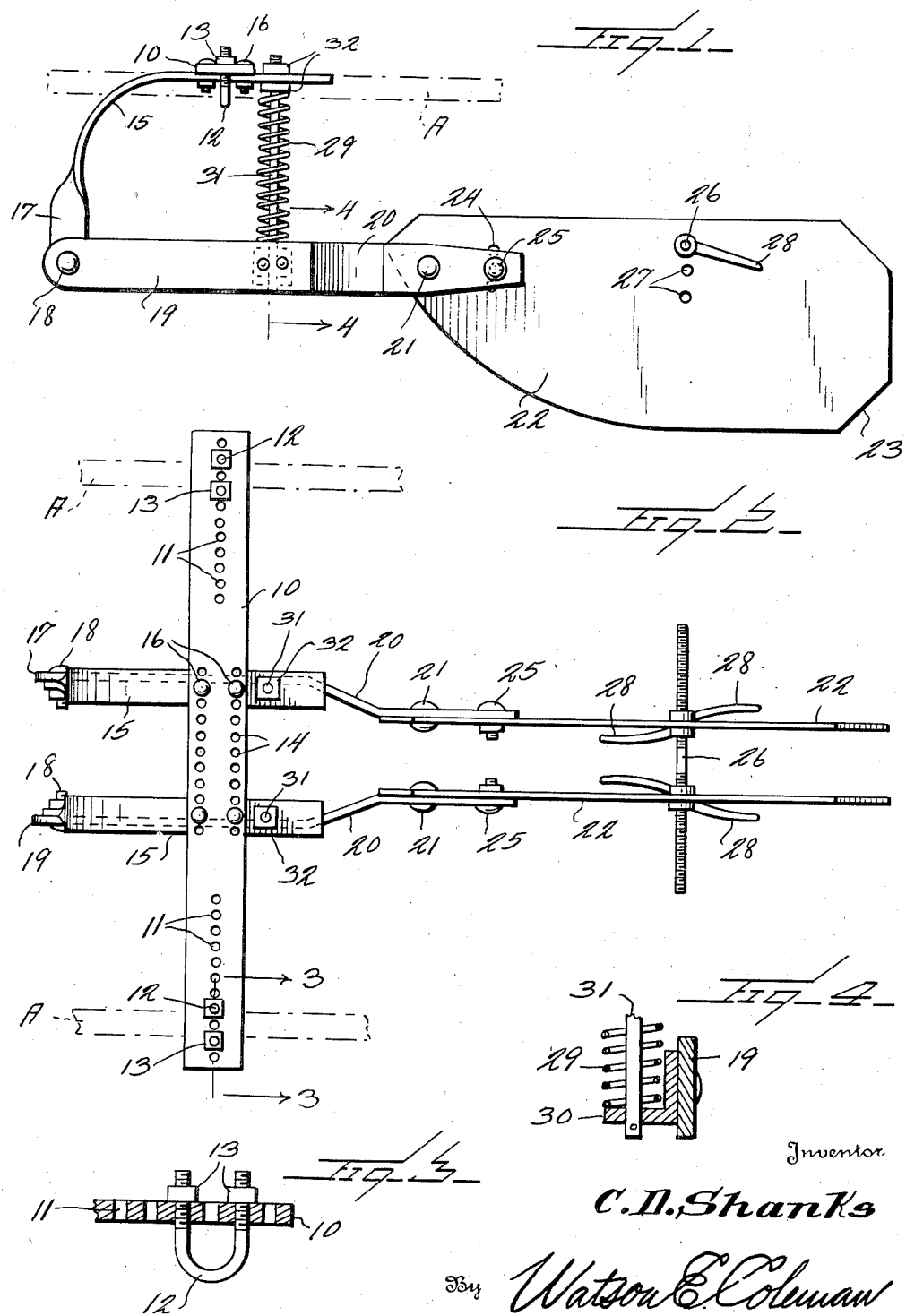

2,116,161

UNITED STATES PATENT OFFICE 2,116,161

CULTIVATOR BRACING AND FENDER ATTACHMENT

Carlyle D. Shanks, Abilene, Tex.

Application January 30, 1937, Serial No. 123,282

4 Claims. (Cl. 97—188)

This invention relates to cultivator attachments and particularly to an attachment designed to prevent lateral movement of the beams of a cultivator and further designed to support plant fenders which will guard the plants and permit the cultivator shovels to operate very close to the plants.

All cultivators, both old and new, have a certain amount of slackness or play at the points of connection of the beams to the main frame which allows the cultivator sweeps, plows or shovels to shift laterally and thus dodge weeds, grass or hard ground. This play ranges from 2″ to 6″. This makes it extremely difficult, if not impossible, to plow or cultivate close to the plants, and the cultivator sweeps are, under these circumstances, likely to throw weeds and grass over on to the unplowed ground where they take root and spring up again and have to be hoed out. Thus, with the commonly used cultivators, it is usual to plow as near to the plants as possible and then hoe up close to the plants. This is expensive and laborious.

With these objections in view, my object is to provide an attachment which will permit plowing or cultivating close to the plants and further to provide a cultivator attachment which prevents the cultivator beams and the sweeps carried thereby from wobbling or "dodging" but instead holds them rigidly in place.

Another object is to provide plant shields or fenders disposed between the sweeps and the plants, which will prevent the plowed up earth with the weeds and grass being thrown laterally onto the plants.

Further objects have to do with certain minor advantages secured by the detailed structure now to be described.

My attachment is illustrated in the accompanying drawing wherein:—

Figure 1 is a side elevation of the attachment, the cultivator beam being shown by dotted lines.

Figure 2 is a top plan view of the attachment in place, the cultivator beams being shown in dotted lines.

Figure 3 is a fragmentary section on the line 3—3 of Figure 2.

Figure 4 is a fragmentary section on the line 4—4 of Figure 1.

In this drawing, 10 designates a transversely extending beam brace which is designed to rest upon the cultivator beams A. The ends of this brace are formed with a plurality of holes 11 through which the ends of a U-bolt 12 may be passed, the nuts 13 engaging the upper face of the brace 10, as shown in Figure 3, and the U-bolt engaging around the cultivator beams A. By providing a plurality of holes 11, the beams A may be adjusted nearer to or further from each other to suit the width of the rows being cultivated. This brace 10, when applied, will hold the cultivator beams rigidly in place and prevent any slackness or lateral swinging of the cultivator beams.

The middle portion of the brace 10 is provided with a plurality of perforations 14 arranged in two rows. Coacting with the middle portion of the brace 10 are the downwardly and forwardly curved hangers 15. The forward ends of these hangers are formed with a pair of perforations through which the bolts 16 pass, these bolts passing through a pair of perforations 14. The hangers 15 extend downward and forward, that is, toward the forward end of the cultivator, this forward end being towards the left in Figs. 1 and 2 and are twisted at their rear ends at 17 and are there pivoted by a pivot bolt 18, each to a forwardly extending shank 19. The shank 19 at its rearward end is deflected inward at 20 and then extending rearward, and this rearwardly extended portion is bolted, riveted or otherwise attached, as at 21, to the forward end of a fender or guard 22. This fender is wider at its rear end than at its forward end, has beveled corners 23 and has its lower edge extended forward in nearly a straight line and then upward and forward to the shank 19. This fender, which is formed of sheet metal, is provided with a plurality of perforations 24 just rearward of the pivot bolt 21, and a bolt 25 passes through any one of these perforations. The perforations 24 are arranged concentrically to the pivot 21 and thus the rear end of the fender may be adjusted upward or downward.

To adjust the fenders toward or from each other to accommodate plants or rows of different widths, I provide a screw or double threaded bolt 26 which is adapted to extend loosely through any one of three apertures 27 in the fender. This screw has threads on each end portion which extend reversely to each other and coacting with these threads are the four nuts 28, there being a pair of nuts for each of the fenders 22 and each nut having a tail whereby it may be readily manipulated. These pairs of nuts hold the fender blades 22 firmly in position and prevent the fender blades from either moving inward or outward and out of their adjusted positions.

For the purpose of forcing each fender downward into contact with the ground and causing them to move in accordance with the irregularities of the ground, I dispose between the fender hanger 15 and the fender shank a coiled compression spring 29. The lower end of this spring is supported upon a small angle iron 30 riveted, welded or otherwise attached to the shank 19. Extending upward through the spring is a bolt or pin 31 which at its lower end extends through the bracket or angle iron 30, and at its upper end is screw threaded and carries the opposed nuts 32, one on each side of the hanger 15. The bolt 31 is more or less loose in the bracket 30, so that the spring 29 urges the shank 19 and the fender downward while, at the same time, it will permit the fender to move upward. By this means, the fender can rise over obstructions and then will be immediately forced back in place. The jam nuts 32 may be adjusted, of course, to raise or lower the fender to secure proper protection for the plants.

In the ordinary construction of cultivators where fenders are used, these fenders are disposed from 8" to 12" from the plants or from the row and, as a consequence, grass and weeds are thrown by the sweeps over onto the unplowed ground and take root there. With my construction, the fenders may be so adjusted that it is possible to plow within an inch of the plants, and this entirely eliminates the necessity of hoeing this strip of ground between the plowed ground and the plants.

The brace 10 is extremely important. In old cultivators and even new cultivators, the beams may be pushed apart or pulled together anywhere from 2" to 6". By the use of this brace 10, the beams are fastened rigidly to the brace and each set of plows are braced by the other set, so that there is no possible play in the cultivator beams and, therefore, no play in the plows. This makes an old worn out cultivator plow like a new one and keeps a new cultivator tight, thus doubling its life. The fenders 22 can be readily removed and the brace used if the fenders are not needed as, for instance, when plants get large. My fenders are compact and in one unit, attached to the brace 10, and are rigidly held in position by the two bolts 16 passing through the two sets of openings 14. These fenders are further held from any lateral movement by bolt 26, thus serving to regulate the width of the fenders with reference to the plants. With a rigid beam and a rigid fender, the operator may plow within an inch of small plants without any damage to the plants.

In actual practice, I have set these fenders 1" apart with the cultivator sweep points ½" from the fenders and have cultivated some 200 acres of bad land without having to do any hoeing whatsoever. This attachment saves the plants and permits thorough plowing of every inch of the soil up to the plants instead of covering up unplowed ground with grass and weeds. By plowing close to the plants, moisture is conserved and time and labor saved.

Attention is called to the upwardly extending bevel 23 on the rear end of the fender 22. This bevel 23 allows fine dirt to settle around small plants but the fender holds back large clods that might be in the way when plowing close. It is very necessary that the fender be provided with a plurality of perforations 27 for the bolt 26. I have found in actual practice that to obtain best results in plowing or cultivating very small plants that bolt 26 be placed in the lowest hole 27 and then the fender be raised just clear of the ground allowing fine earth to come up around the plants leaving a clear drill behind. As plants get larger, the bolt 26 is raised.

What is claimed is:—

1. The combination with the pivoted beams of a cultivator, of a transversely extending brace resting upon the cultivator beams rearward of the pivots for said beams and having a plurality of perforations extending along the brace, there being a plurality of perforations adjacent each beam and a plurality of perforations along the middle portion of the brace, beam clamping members engaging the beams and the perforations in the brace whereby to brace the beams one from the other, fenders having shanks, means engaging the fender shanks with the brace through certain of the perforations at the middle of the brace whereby the fenders may be adjusted toward or from each other, means for holding the fenders in spaced relation to each other adjacent the rear ends of the fenders, and means resiliently urging the fenders downward but permitting upward movement of the fenders.

2. A bracing and fending attachment for cultivator beams, comprising a transversely extending brace having a plurality of perforations at each end, means coacting with the perforations for engagement with a cultivator beam to thereby hold the beams in rigid relative position, the middle portion of the brace having a plurality of pairs of perforations, hangers bolted to the brace through the last named perforations whereby the hangers may be adjusted toward or from each other, the hangers extending forward and downward, fender shanks pivotally connected to the lower ends of the hangers and extending rearward therefrom, plant fenders attached to said shanks and adapted to ride over the ground, and springs urging said fender shanks and fenders downward.

3. A cultivator attachment of the character described, comprising a transversely extending brace formed with a series of perforations adjacent each other, U-bolts engageable with said perforations and engageable with the cultivator beams, the middle portion of the brace having two transversely extending rows of perforations, a pair of hangers having their upper ends disposed against said brace and adapted to be bolted through said perforations to the brace, the rows of perforations permitting the hangers to be adjusted toward or from each other, the forward ends of the hangers extending downward, fender shanks pivoted to the forward ends of the hangers and extending rearward therefrom, fenders pivotally mounted upon the rear ends of the shanks and adjustable to a limited degree around said pivots, guide bolts extending upward from the fender shanks and through the rear ends of the hangers, the fender shanks having vertical sliding movement upon the guide bolts, and springs surrounding the guide bolts and urging the fender shanks downward.

4. A cultivator attachment of the character described, comprising a transversely extending brace formed with a series of perforations adjacent each other, U-bolts engageable with said perforations and engageable with the cultivator beams, the middle portion of the brace having two transversely extending rows of perforations, a pair of hangers having their upper ends disposed against said brace and adapted to be bolted through said perforations to the brace, the rows of perforations permitting the hangers to be adjusted toward or from each other, the forward ends of the hangers extending downward, fender shanks pivoted to the forward ends of the hangers and extending rearward therefrom, fenders pivotally mounted upon the rear ends of the shanks and adjustable to a limited degree around said pivots, guide bolts extending upward from the fender shanks and through the rear ends of the hangers, the fender shanks having vertical sliding movement upon the guide bolts, springs surrounding the guide bolts and urging the fender shanks downward, a transversely extending bolt disposed through both of the fenders and having reversely screw threaded portions, and a pair of jam nuts for each fender engaging on opposite sides thereof.

CARLYLE D. SHANKS.